No. 825,320. PATENTED JULY 10, 1906.
E. G. HEWITT.
SPIRIT LEVEL.
APPLICATION FILED JULY 8, 1905.
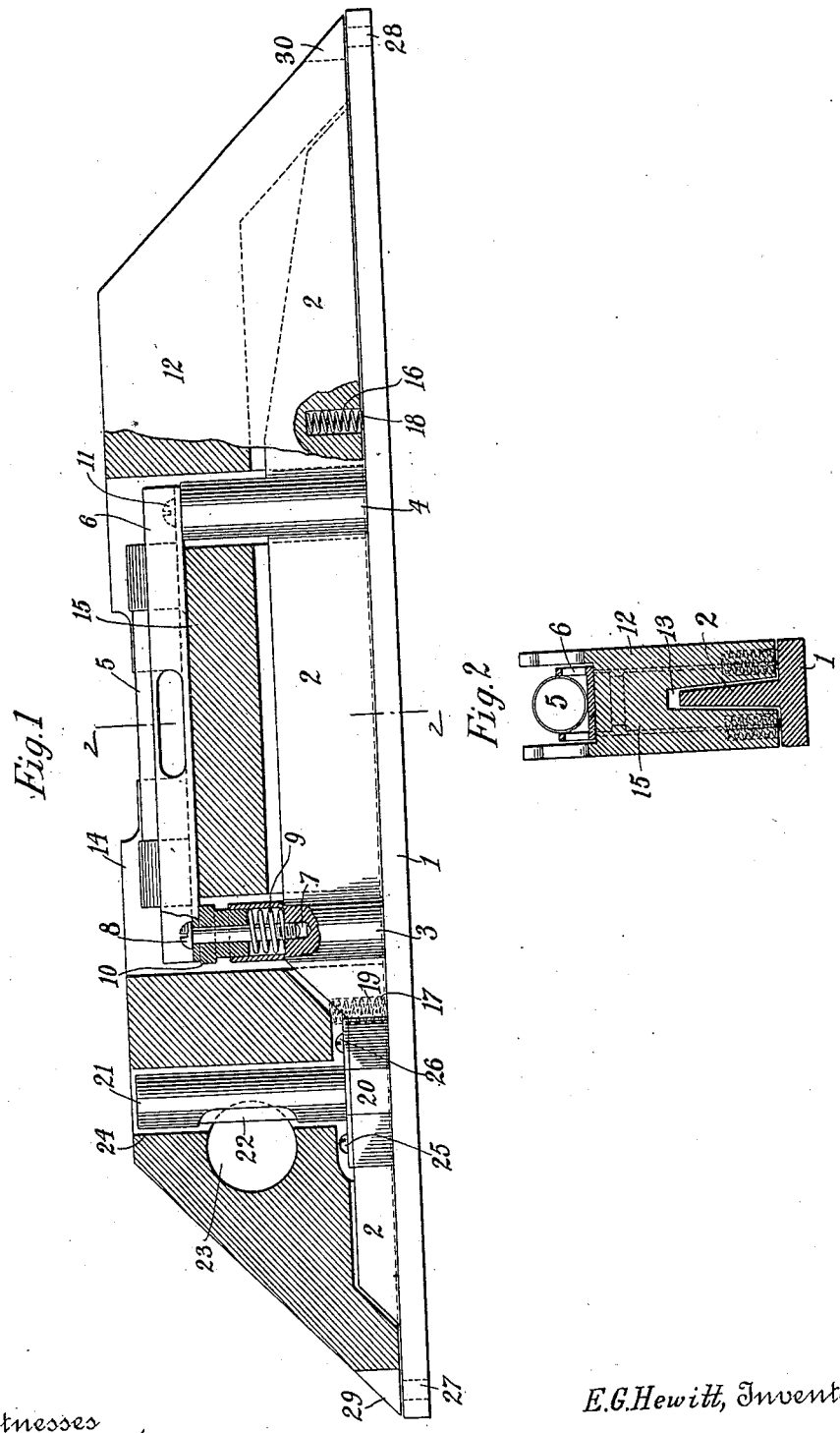
Witnesses
Raphael Netter
S S Dunham
E. G. Hewitt, Inventor
By his Attorneys
Kerr, Page & Cooper

UNITED STATES PATENT OFFICE.

EDWARD G. HEWITT, OF NEW YORK, N. Y.

SPIRIT-LEVEL.

No. 825,320.　　　Specification of Letters Patent.　　　Patented July 10, 1906.

Application filed July 8, 1905. Serial No. 268,835.

*To all whom it may concern:*

Be it known that I, EDWARD G. HEWITT, a citizen of the United States, residing at New York, in the county of Kings and State of New York, have invented certain new and useful Improvements in Spirit-Levels, of which the following is a specification, reference being had to the drawings accompanying and forming a part of the same.

My invention relates to spirit-levels, and has for its chief object to provide a device of this kind which shall be accurate and which shall preserve its accuracy indefinitely.

It is desirable in general that spirit-levels for the use of carpenters, masons, and other mechanics should be large enough in size for convenient handling and also for convenient application to the work on which the mechanic is engaged. Ordinarily such levels are made with a wooden body or framework, and so far as size and convenience are concerned such a level serves its purpose quite satisfactorily; but wood, as is well known, is very susceptible to changes of heat and cold and humidity, such variations causing unequal expansions and contractions of the wood. These distortions not only impair the accuracy of the level for the time being, but also permanently, and the shape of the wooden body is so changed that mere readjustment of the spirit-tube is not sufficient to restore the accuracy of the instrument. The difficulty might be overcome by constructing the level entirely of metal; but to make the same of the desired size would produce an instrument of a weight too great to be at all practicable. I have therefore been led to devise my present invention, which combines the advantages of the all-metal level, so far as permanent accuracy is concerned, together with the substantial advantages of a wooden level as regards lightness and convenience.

In carrying out my invention I provide a metal base, on which is adjustably mounted the spirit-tube, so that the latter may be accurately positioned. This metal base and the spirit-tube are secured to a wooden body part or a body part composed of any suitable non-metallic material of the desired lightness, but in such manner that the body is secured loosely, so that contractions, expansions, or other distortions thereof due to dampness or other causes will produce no appreciable effect, if any, upon the metal base which supports the spirit-tube.

For a more detailed explanation of my invention reference may now be had to the annexed drawings, in which—

Figure 1 is a side view, partly in longitudinal vertical section; and Fig. 2 is a section on line 2 2.

The metal base, which constitutes what may be termed the "foundation" of the level, is designated by 1. Extending longitudinally of the base is a rib 2, and extending a short distance above the rib are standards 3 4, the distance between the two standards being slightly greater than the length of the spirit-tube which is intended to be used. The spirit-tube 5 is carried by a trough 6, which is secured to the standards 3 4, on the upper ends thereof. One of the standards, as 3, is tubular for a part of its length at least and at the bottom thereof has a threaded aperture 7 to receive the screw 8. Within the standard is a spring 9, which presses upwardly against a plug 10, which fits the tubular standard closely, yet loosely enough to respond freely to the pressure of the spring. Upon the plug 10 rests one end of the trough 6, and through the latter passes the screw 8. The other end of the trough is secured by a screw 11 to the standard 4. When it is desired to adjust the level, the screw 8 is turned in or out, as the case may require, thereby lowering or raising that end of the trough. If a considerable range of movement is needed to effect the necessary adjustment, the screw 11 may be loosened, but in general the very slight movement necessary to correct the instrument will take place without affecting the screw 11.

The body of the instrument, which covers or incloses the metal part just described, is indicated by 12. As shown, it consists of a member of substantially rectangular cross-section, and in one edge thereof is provided with a longitudinal groove 13 to receive the rib 2 on the metal base. At the proper points the groove is enlarged and continued clear through the block to receive the standards 3 4. On the upper edge of the block is a groove or cavity 14, the depth of which reaches slightly below the top of the standard 4. The purpose of this cavity is to receive the trough 6, leaving at the same time a bridge 15 across the block. To place the body in position on the base, the trough 6 is removed by withdrawing the screws 8 and 11, whereupon the block may be slipped down upon the base, the bridge 15 fitting loosely between the upper end of the standards 3 4. The trough 6 may now be replaced, whereupon it will be seen that the block 12 is securely but loosely held upon the base by the trough 6, engaging the bridge 15. To give the level a certain amount of solidity in handling—that is, to conceal partially at least the loose connection between the base and the body of the instrument—the former may be provided with openings 16 17 in the lower edge thereof, in which are arranged coil-springs 18 19, which raise the block and cause it to press with a slight degree of firmness against the under side of the trough 6. Whatever expansion or contraction of the wooden body may occur will not be transmitted to the metal base, but will be lost in the springs, which will of course yield or expand with the body.

If desired, the instrument may be provided with a spirit-tube at right angles to the one just described, so that the instrument may be used as a substitute for a plumb-line in the well-known way. For this purpose the rib 2 is provided with an enlargement or boss 20 at one end of the base, to which is fastened the vertical tube 21, serving as an outer casing of the spirit-tube 22, which is open to inspection through a suitable opening in the tube 21 and a circular aperture 23, extending transversely through the body 12 at the proper point. To accommodate the tube 21, the body 12 is pierced with a vertical opening 24. The tube 21 is mounted on the boss 20 and is secured thereto by screws 25 26. To adjust the spirit-tube, the screws just mentioned may be turned in or out, as the case may require, and liners or wedges inserted under the base of the tube until the tube is exactly at right angles to the base 1.

Under certain circumstances it may be desirable to fasten the instrument to a large body, so that the instrument may be used on larger work, and for this purpose the base 1 may be provided with holes 27 28 at the ends thereof to receive screws for fastening the base to said auxiliary body. The ends of the body 12 are suitably recessed, as at 29 30, to permit the said screws to pass.

From the foregoing it will be seen that all the parts which are rigidly connected to the level-tube are of metal, and hence are practically unaffected by influences which would cause very appreciable distortion of the same parts if they were made of wood. At the same time the wooden body gives the instrument a size with the necessary lightness for convenient handling and makes it more comfortable to the hand, especially in cold weather, and that without in any way rendering its accuracy liable to be impaired.

The embodiment herein described is of course only one of the many forms which my invention may take, and I therefore do not consider myself limited to the precise structure shown.

What I claim is—

1. The combination with a metal base, and a level carried thereby, of a wooden block or case inclosing the level, but permitting inspection thereof, and secured loosely to the base to permit distortion of the block or case without affecting the accuracy of the instrument, as set forth.

2. The combination with a metal base, and a level removably supported above the same, of a one-piece wooden block or case inclosing the level but permitting inspection thereof, loosely secured to the base and removable after removal of the level from its supporting means, as set forth.

3. The combination with a metal base having a longitudinal rib, a pair of standards extending above the ribs, a level removably supported on the standards, and a one-piece wooden block or case loosely fitting the base and inclosing the level but permitting inspection thereof, and having a bridge or bar extending across the space below the level, whereby the block is held in place on the base by the level and is removable after removal of the latter, as set forth.

4. The combination with a metal base, and a level above the base and connected thereto; of a wooden body on the base, permitting inspection of the level and having a bar extending between the level and the base; and springs intermediate to the body and the base; as set forth.

5. The combination with a metal base, and a level carried thereby, of a wooden body or case mounted loosely on the base whereby it may move freely relatively to the base and level, as set forth.

EDWARD G. HEWITT.

Witnesses:
M. LAWSON DYER,
S. S. DUNHAM.